United States Patent [19]

Thompson

[11] Patent Number: 5,255,088
[45] Date of Patent: Oct. 19, 1993

[54] SYSTEM AND PROCESS FOR VIDEO MONITORING A WELDING OPERATION

[75] Inventor: Gary J. Thompson, Saugus, Calif.

[73] Assignee: Arc Machines, Inc., Pacoima, Calif.

[21] Appl. No.: 827,615

[22] Filed: Jan. 29, 1992

[51] Int. Cl.$^5$ .............................................. H04N 7/18
[52] U.S. Cl. .................. 358/101; 219/121.23; 358/225; 359/241; 359/244
[58] Field of Search ............ 358/93, 101, 100, 225; 359/359, 360, 241, 244; 219/121, 23

[56]   References Cited

U.S. PATENT DOCUMENTS

| | | | |
|---|---|---|---|
| 2,049,765 | 8/1936 | Fischer | 252/301.4 R |
| 2,219,895 | 10/1940 | Hanlein | 252/301.4 F |
| 2,662,035 | 12/1953 | Levi | 428/432 |
| 2,662,036 | 12/1953 | Levi | 427/384 |
| 2,971,853 | 2/1961 | Stookey | 501/4 |
| 3,020,238 | 2/1962 | Munakata et al. | 252/301.6 R |
| 3,208,860 | 9/1965 | Armistead et al. | 501/13 |
| 3,225,138 | 12/1965 | Montani | 358/217 |
| 3,454,778 | 7/1969 | Eisner | 250/237 R |
| 3,459,889 | 8/1969 | Michels et al. | 358/228 |
| 3,756,692 | 9/1973 | Scott | 219/147 |
| 4,168,512 | 9/1979 | Ito et al. | 358/225 |
| 4,169,655 | 10/1979 | Jacobsson | 359/360 |
| 4,272,164 | 6/1981 | Trussell, Jr. | 259/275 |
| 4,730,096 | 3/1988 | Mizumoto | 219/130.01 |
| 4,868,649 | 9/1989 | Gaudin | 358/101 |
| 4,918,517 | 4/1990 | Burgoon | 358/101 |
| 4,978,208 | 12/1990 | Hsu et al. | 351/45 |

FOREIGN PATENT DOCUMENTS 53-78721  7/1978  Japan .

OTHER PUBLICATIONS

Megla, "Optical Properties and Applications of Photochromic Glass" vol. 5, No. 6, Applied Optics Jun. 1966, pp. 945-960.

Primary Examiner—Howard W. Britton
Attorney, Agent, or Firm—Lewis Anten

[57]   ABSTRACT

A configuration or system of lenses for use in an arc welding environment variably filters light so that the dramatic contrasts of light present in the welding area are reduced for better remote viewing. A photochromic lens forms a negative image of the welding area. The negative image of the photochromic lens serves as a variable density optical filter to reduce the brightness of the image incident upon the photochromic lens. A first lens initially gathers and focusses the light upon the photochromic lens. Subsequent lenses further prepare the image for camera reception by eliminating ultraviolet (UV) light, by eliminating light at spectral lines, and/or by enhancing the depth of field of the image.

10 Claims, 4 Drawing Sheets

FIG. 1

FIG. 2 METHOD A

FIG. 3

METHOD B

SYSTEM AND PROCESS FOR VIDEO MONITORING A WELDING OPERATION

BACKGROUND OF THE INVENTION

1. Field of the Invention

This invention relates to the use of cameras for monitoring a remotely located welding operation, particularly the automatic adjustment of light incident upon the camera to reduce glare from the welding arc for better contrast resolution and clearer imaging.

2. Description of the Related Art including information disclosed under 37 C.F.R. §§ 1.97-1.99

The arc welding machines used for welding pipes of large dimensions are the orbital type and incorporate a motorized support member mounted for movement on a circular rail fixed on one of the pipes being joined. On this support member is mounted a welding head incorporating an electrode permitting the refusion of filler wire continuously fed to the zone of the arc struck between the electrode and the junction zone of the parts. The welding head is mounted for oscillation in the transverse direction in relation to the orbital movement of the welding machine. A sweep is thus made over the width of the weld bead.

Systems for video monitoring an arc welding operation are known in the prior art. Such systems are often used in situations where it is impossible or impractical for a human operator to have direct, hands-on access to the workpiece such as when a weld must be produced in the inner diameter of a pipe, or within the radioactive environment of the steam pipes of a nuclear power generator. These video monitoring systems allow the welder to observe the position of the electrode and the filler wire relative to the workpiece, as well as the characteristics of the weld puddle created by the electric arc. This information helps the operator to remotely control the dynamics of the weld puddle so that the weld is produced uniformly and without flaws.

To lengthen the life of a nuclear power station, it has been proposed to use new piping systems to replace older piping systems and other components which, due to many factors, are deemed to have reached the end of their useful life.

To replace the whole of a steam generator, it is in particular necessary to join, by welding, the primary water inlet and outlet connections of the steam generator to the corresponding primary circuit pipes held ready in the reactor building. This operation can be carried out by a semi-automatic welding operation controlled from a control station situated a certain safe distance from the welding zone properly shielded against nuclear radiation. In order to ensure proper welding throughout the operation, an operator must permanently monitor the welding operation with the aid of a visual display, on a television screen, of the zone in which the weld bead is formed.

It is necessary to provide a very clear image of the welding zone, because only with the aid of the image on the screen can the operator evaluate any action that must be taken to achieve the deposition of a perfect weld bead. It is in fact necessary to obtain a deposit of weld metal which is free from defects as defective welds can lead to expensive re-work or failure. The high temperatures that are used to weld two pieces of material together, typically two metal pieces, are accompanied by high light intensities creating dramatic contrasts between lit and dark areas. This coupling of high temperature with bright light creates problems when the welding area requires close inspection during the welding process.

Originally, welders used masks with plates of heavily darkened glass in order to observe the welding area. However, remote controlled welding in hazardous environments, such as nuclear facilities, have become more commonplace. For these hazardous environments, remote controlled welding machines have been developed that allow a welder to control the welding operation from a safe environment.

In order to observe the welding procedure from a safe environment, video cameras are used to view the welding operation in order to monitor the progress and quality of the weld. Such cameras may be n"charge coupled devices" or CCD's and allow the welder to observe the welding environment under normal conditions. However, when the welding arc is lit, it emits a relatively broad spectrum of light, including light within the infrared, visible, and ultraviolet spectrums.

The images produced by such video monitoring systems are generally not as clear and informative to a welder as the image he might see through a conventional welding hood. This difference in quality stems largely from the fact that the sensing circuit of a conventional television camera (which is a pixel array of a light-sensitive charge coupled device) does not have the interpretative abilities that the human eye has when used in combination with the brain. While the filter glass used in a conventional welding hood passes an image (where the arc is essentially white and the background of the workpiece is very nearly black) the eye and brain are able to interpret this image so that the welder is able to see fairly clearly the position of the electrode of the torch relative to the workpiece, the resulting weld puddle, the contour of the weld, and the wettability of the leading edge of the puddle.

In the case of a television camera, the bright image of the arc saturates a portion of the charge coupled device (CCD) of the light sensing circuit, yielding a television image that includes severe contrasts wherein the background surrounding the electric arc is darkened into obscurity. The emission of visible light from the welding torch is so intense that the image transmitted by the CCD is not clear. The arc and its proximate plasma overloads the video camera, obscuring the weld puddle melted by the welding torch. Additionally, the light filtration components in these systems may create "ghost" images and stray refractions which further blur the resulting image.

The problem presented when monitoring remotely controlled welding operations is how to observe the welding operation in the glare of the welding torch that obscures a view of the weld puddle formed between the surfaces being welded together.

In an attempt to balance these severe contrasts between the welding area with the arc torch and the surrounding area, some prior art television systems have employed pulsed light sources such as xenon flash units or lasers synchronized with the actuation of the television camera, in combination with narrow bandwidth filters which conduct only a very narrow range of the light frequencies present in the spectrum of the xenon or laser light. As only the pulsed light is allowed through the filter, the light from the arc is eliminated and the welding area is viewed by illumination by the pulsed light. Unfortunately, only a monochrome image is obtained as only the filtered light is used to form an image. Also, the use of such background lighting requires the positioning of still another component in the often limited access area around the weld, and increases the cost of the operation of the monitoring system.

Televisual observation of the welding zone is therefore complicated by the existence of a very bright spot or zone, corresponding to the arc moving over the width of the weld bead, at the center of the welding zone. The weld bead on which the operator must concentrate his attention may be poorly visible because of the very high luminous intensity of the arc.

In the prior art, a semi-opaque filter in the form of a small dot placed strategically between the CCD camera and the arc of the welding torch has been used. The small dot performs much like the hand of a person placed to block the sun when looking at a plane in the sky on a sunny day. The small dot casts a shadow upon the CCD effectively obstructing the glare emitted directly from the welding torch. While this technique is partially effective, drawbacks remain.

Foremost of these drawbacks is the obstruction of the scene that is of most interest in the welding operation, the activity at the tip of the welding torch. Dirt or other foreign matter cannot be seen in the weld when obstructed by the dot. Neither can the weld puddle, filler wire entry or other processes at the arc tip be seen. Other details in the critical welding area are likewise obscured. The static nature of the dot's position requires the camera to display the same scene relative to the welding arc so that the dot may continually block the intense light emitted from the welding arc. Other views are not permitted. Also, the parts of the welding zone which are not directly subjected to the light of the ar will then be poorly visible, even if floodlights are used to illuminate the welding zone.

To achieve effective monitoring of the welding in progress, the operator must be provided with an image of the entire welding zone which is sufficiently clear, in particular, for verification of the state of the bead just deposited and its position in relation to the other beads deposited previously, and also for monitoring the progress of the welding.

In addition to the problem of obscuring contrasts, a second major problem associated with many prior art systems is the mechanical interference that the components of the video monitoring system impose upon the movement of the weld head. In some systems, the movement of the weld head is limited by a relatively large and bulky camera assembly which is connected directly on the weld head. The relatively large and bulky size of such camera assembly is due in part to the fact that such assemblies must contain not only the television camera, but a separate array of lenses, electronic light valves, iris diaphragms, neutral density filters or cross-polarizing filters all positioned in tandem which are used to dim the image of the arc before it strikes the light-sensitive array of charge coupled devices within the camera. In an attempt to solve the mechanical interference problems caused by the mounting of the camera assembly on the weld head, some other prior art systems use fiber optical cables to remotely transmit an optical image to a television camera. However, these fiber optical cables lose a great deal of the transmitted light which reduces the resulting resolution of the television image, and are easily browned and burned out by nuclear radiation which in turn requires costly frequent replacement.

The bulky nature of previous systems was only compounded by the addition of extra equipment allowing the welding arc to be blocked in a movable or dynamic manner or, to move the blocking spot that obscured the welding arc. Previous systems designed to block the overwhelming glare of the welding arc were expensive, limiting their availability in a variety of Clearly, there is a need for a television monitoring system for observing a welding operation which produces a clear, sharp and contrast-balanced image where the portion of the workpiece surrounding the welding arc is easily visible without the need for auxiliary background lighting. Ideally, such a system should be compact enough in design so as to offer little or no mechanical interference to the weld head as it is manipulated during a welding operation. Moreover, the system should be comprised of a small number of simple and inexpensive parts that are capable of producing a clear and well lighted welding image under a variety of different conditions and for a variety of different welding systems. There is a need for dynamic optical filtration of the welding arc glare so that the camera monitoring the welding process could be moved and positioned for the best view without limitation due to the position of the welding arc relative to the camera.

SUMMARY OF THE INVENTION

A camera and lens system for dynamically filtering welding torch glare is set forth which permits clear viewing of a remote welding operation. A lens made of photochromic material is used between the welding area and the camera to create a negative image of the welding area that dynamically filters the glare from the welding area. Effectively, the intense light from the welding area passes through its own shadow. The result is that where there is intense glare in the welding area, the glare is diminished in proportion to its strength. Where the glare is less intense, less filtering is imposed.

In the preferred embodiment of the present invention, a lens focusses light from the welding area on a photochromic plate. The photochromic plate responds to the incident light from the welding operation by darkening or becoming somewhat opaque according to the intensity of the incident light impinging at that point of the photochromic lens. A negative of the welding area is thus created by the photochromic plate. Light emitted directly from the welding operation shines upon the photochromic lens with its darkened image of the welding operation. The resulting image transmitted by the photochromic plate, and ultimately onto the CCD or other camera, is an accurate depiction of the welding area with the light intensity greatly reduced by proportion of glare and more easily received and accurately represented by a video camera.

OBJECTS OF THE INVENTION

It is an object of this invention to provide better remote monitoring of a weld area.

It is another object of this invention to provide means to reduce weld area glare for camera reception.

It is still another object of this invention to provide greater operator safety and greater weld integrity by better depicting remote welding operations.

It is yet another object of this invention to provide a camera and lens system for the reduction of intense glare that is simple, reliable, mechanically sound, easy to use, and uncomplicated while providing an accurate depiction of the area at and surrounding the source of the intense glare.

These and other objects and advantages of the present invention will be apparent from a review of the following specification and accompanying drawings.

DESCRIPTION OF THE PREFERRED EMBODIMENTS

Figure 1:
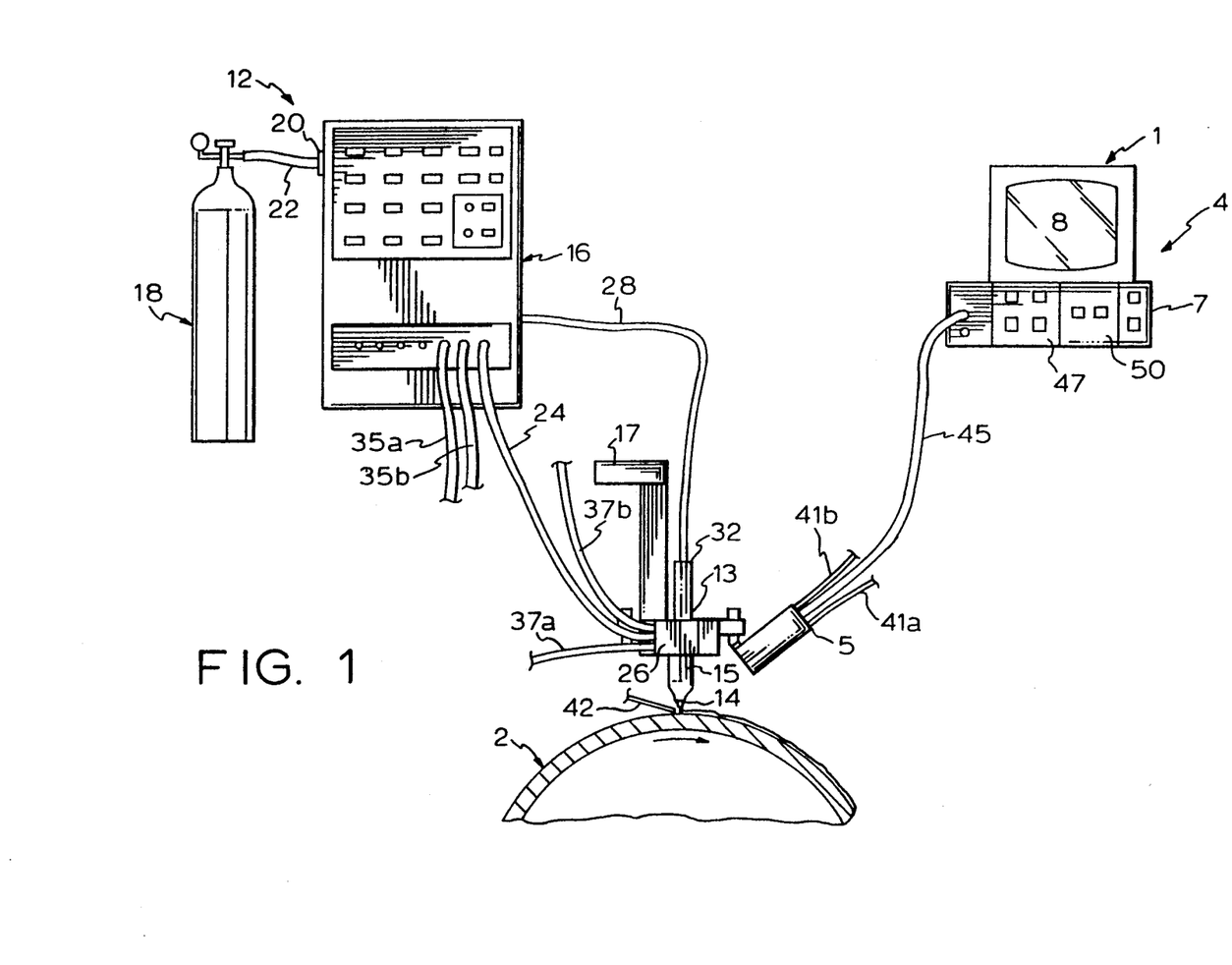
FIG. 1 is a cross-sectional schematic representation of a welding device incorporating the present invention.

Referring to FIG. 1, a general diagram for remote controlled welding is shown. The system 1 for video monitoring a welding operation on a workpiece 2 which may be a pair of pipe sections being welded together generally comprises a television monitoring system 4, a television camera assembly 5 mounted on one side of the workpiece 2, an image processing circuit 7 which may be any one of the number of conventional video processing circuits, and a television monitor 8 for displaying the images received by the camera assembly 5.

The welding system 12 that the video monitoring system 1 is preferably used in conjunction with includes a torch assembly and wire manipulator 13 having a tungsten electrode 14 that is surrounded by a gas-conducting ceramic sleeve 15. The tungsten electrode 14 of the torch assembly 13 is electrically connected to a power supply 16, and mechanically connected to a robotic arm 17 that remotely guides and manipulates the weld head 13. The torch assembly is further connected to a bottle of pressurized, inert gas 18 such as argon or helium through the power supply 16. Specifically, the power supply 16 includes a fitting 20 for receiving an inlet hose 22 connected to the bottle 18 of pressurized gas, as well as an outlet hose 24 that is in turn connected to a fitting 26 centrally located within the torch assembly 13.

The power supply 16 is connected to the torch assembly 13 by means of a power cable 28 by way of an electrical and mechanical connector 32. The power supply 16 has water circulation inlet and outlet hoses 35a and 35b. These hoses are respectively connected to the inlet and outlet hoses 37a, 37b of the torch assembly 13, as well as the inlet and outlet hoses 41a, 41b connected to both of the camera assembly 5 in order to maintain the camera assembly 5 and the torch assembly 13 cool during a welding operation. Any one of a number of conventional welding power supplies 16 may be used in conjunction with the system 1 of the invention. A wire feeder 42 is further included with the torch assembly 13 in order to provide a uniform supply of fusible metal during a welding operation which may be used to fill the weld joint or to build up weld overlays.

Coaxial cable 45 connects the camera assembly 5 to the image processing circuitry 7 of the video monitoring system 4. The image processing circuitry 7 also includes a gain control 50 which the operator may use to adjust the overall brightness of the image displayed on the television monitor 8.

Two embodiments of the current invention have been developed. Both embodiments use the light emitted by the welding torch to create a negative image of the welding area. These embodiments would normally be placed inside the camera assembly 5 in order to filter the light incoming to the camera C.

Figure 2:
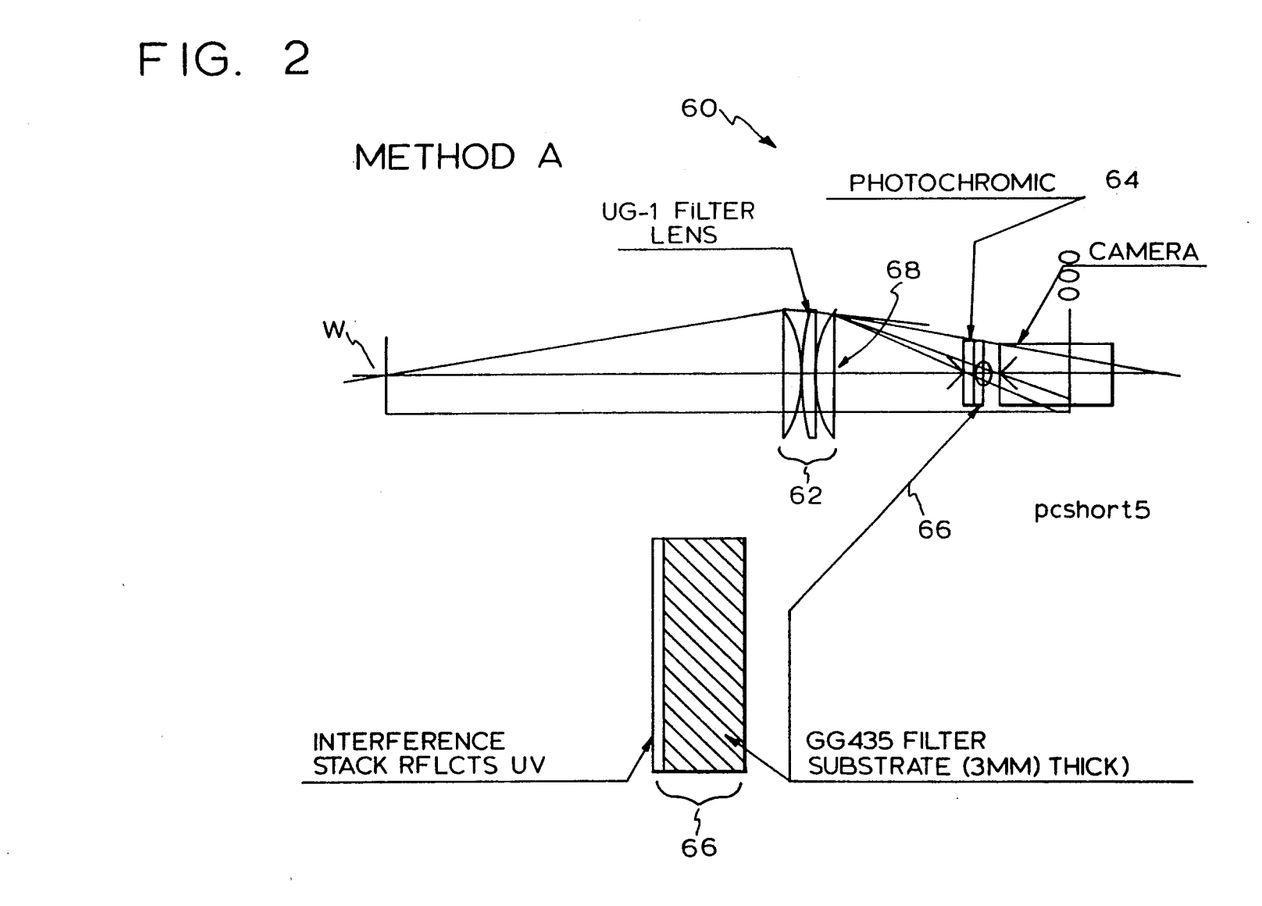
FIG. 2 is a cross-sectional schematic view of the first embodiment of the present invention.

In the first embodiment 60 as shown in FIG. 2, light from the welding operation W passes through a filtering lens assembly 62, a photochromic lens 64, and an ultraviolet (UV) blocking lens 66 before the light is transmitted to the camera C.

Light from the welding operation W is first gathered by a filtering lens assembly 62. The filtering lens assembly 62 as shown in FIG. 2 is compose of three elements. A first lens 62a, a second lens 62b, and a third lens 62c. First and third lenses 62a and 62c pass and focus both visible and UV light. The second lens 62b filters out visible light, but passes and focusses UV light.

The second lens 62b may serve to focus the ultraviolet light on the photochromic lens 64 located in front of the camera. However, it need not do so. Focussing the UV light by means of the filtering lens 62b separates the UV light from the visible light. The UV light may then be focussed at a different location than the visible light.

This separation of UV and visible light allows the use of present commercial CCD cameras to be used in the present invention right off the shelf. Commercially available CCD cameras are protected from incident UV and infrared (IR) light by several layers of interference filters located immediately in front of the photoactive plate of the CCD camera. The second filtering lens 62b may be constructed to focus the UV light from the welding area W on the photochromic lens 64, just in front of the CCD camera and its filtering layers while the visible light may be focussed by the first and third filtering lenses 62a and 62c upon the optically active plate of the CCD camera. As further described below, this optical configuration has certain advantages, including putting to use UV light generated by the welding arc that would normally be wasted.

The second filtering lens 62b has a small aperture or hole 68 at its center, allowing all incident light to pass through it, including visible light. The central location of the aperture 68 is best as it does not distort the image arising from the light passing through the aperture 68. As only a small portion of the visible light emitted by the welding arc is allowed past the filtering lens assembly 62, the intensity of visible light possibly transmitted to the camera C is correspondingly reduced.

The filtering lens assembly 62 focuses the UV light upon a photochromic lens 64. The photochromic lens 64 responds to light above short wavelength blue and into the near ultraviolet, becoming darker or more opaque when exposed to UV light and clearer or more transparent when not exposed to UV light. The photochromic lens 64 also responds to visible and infrared light in the spectrum from green to the near infrared in a range of about 450/500 nanometers to 700/1300 nanometers. In response to this other spectrum, the photochromic lens 64 bleaches out, becoming less dark or opaque and becoming more transparent or clear.

In order to best control the opacity of the photochromic lens 64, it is best to have incident upon the photochromic lens 64 only light in the short wavelength blue to near ultraviolet. The bleaching effect of the lower light frequencies is then avoided. However, some visible light must be incident upon the photochromic lens 64 to provide an image for the camera C.

The high temperatures of the welding torch cause the torch to emit UV light which is used to form a negative image of the welding area W in the photochromic lens 64. Where the image of the welding area is brightest, the photochromic lens 64 is darkest and vice-versa.

The negative image formed in the photochromic lens 64 changes with the UV light emitted from the welding area W. When the welding arc is lit, the photochromic lens 64 responds by forming a negative image thereof. When the welding arc is moved relative to the lens system 60, the negative image in the photochromic lens 64 responds by changing with the relative motion. When the welding arc is extinguished, the photochromic lens loses its opacity and becomes more transparent, revealing the cooling welding area W as seen without the intense light of the welding arc.

When the filtering lens 62 focusses the light from the welding area W upon the photochromic lens 64, and the negative image is formed of the welding area W, a dynamic optical filter is created. Whatever image is presented to the filtering lens assembly 62, any glare present in that image is mediated and reduced by its corresponding negative image formed in the photochromic lens 64. In mediating the glare present in the image, no loss of image integrity arises in the image areas that are less dark. The darker areas of the image do pass through their own negative image, however, as their negative image is much less opaque than that for an intense light source, the darker areas are only slightly filtered.

Visible light passing through the aperture 68 of the lens 64. The visible light forms a positive image of the welding area W on the photochromic lens 68. The image formed upon the photochromic lens 64 by the aperture 68 is the corresponding positive image of the negative image formed upon the photochromic lens 64 by the UV light passed by the filtering lens assembly 62. These two images (positive and negative) combine. The dark portions of the negative image make less intense the bright portions of the positive image. Portions of the positive image which are less bright or more dark are not affected by the negative image as the corresponding portion of the negative image on the photochromic lens 64 is less dark or more transparent, respectively.

The light incident upon the photochromic lens 64 is separated by the filtering lens assembly 62 into separate UV and visible components such that the light transmitted by the filtering lens assembly 62 is significantly different from that incident upon the filtering lens assembly 62. The light transmitted by the filtering lens assembly 62 has had removed from it most of the visible light, while most of the ultraviolet light is retained. Accordingly, the ratio of UV to visible (or bleaching) light is greatly increased by the filtering lens assembly 62.

The ratio of UV to visible light is significant to the optical performance of the photochromic lens 64. As the UV light controls the negative image formed on the photochromic lens 64, the enhancement of the UV to visible light ratio greatly increases the performance of the photochromic lens in mediating the intense, glaring light from the welding area W. Effectively, a much darker image is presented to incident visible light by the photochromic lens 64 than could be achieved by merely exposing the photochromic lens 64 to unfiltered welding area light. Although the filtering lens assembly 62 removes much of the visible light, the intense and almost overwhelming glare of the welding torch provides ample visible light for the camera C even after reduction by the filtering lens assembly 62 and passage through the negative image of the photochromic lens 64.

With the separation of the UV and visible portions by the filtering lens assembly 62, the UV portion of the light may be focussed upon the photochromic lens 64 while the visible portion of the light is focussed on the plate of the CCD camera C. This creates a focussed negative image in the photochromic lens 64 through which the visible light passes before reaching the CCD plate of camera C.

Alternatively, the UV portion of the light can also be focussed upon the plate of the CCD camera C. However, this UV portion will be blocked by the UV filters of the CCD camera C. While an unfocussed negative image will arise within in photochromic lens 64, the negative image will correspond exactly to the positive image of the visible light as both UV and visible light are focussed at the same point. By separating the UV and visible portions of the light from the welding area W, more control and better results can be obtained when viewing a welding operation with the camera assembly.

With the union of the negative and positive images on the photochromic lens 64, the resulting image is almost ready for presentation to the camera C. In order to prevent UV light from entering and damaging the camera C, a UV blocking lens 66 is placed in front of the camera and prevents passage of UV light into the camera C.

The UV blocking lens 66 can block incoming UV light in three ways. First, the UV blocking lens 66 can absorb incident UV light. Second, the UV blocking lens 66 can reflect the incident UV light. If the UV blocking lens 66 reflects the UV light coming in from the photochromic lens 64, the UV light can be reflected back onto the photochromic lens 64 to reinforce or enhance the negative image. A combination of both types of UV blocking can also be used.

After the UV light has been eliminated from the combined positive and negative images, the light of the resulting image is passed to a camera C where it is received and transmitted to a monitor so that the welding area W is remotely visible and more easily inspected by video camera as the intense glare from the welding torch has been greatly reduced while maintaining the light reflected from the areas surrounding the welding torch.

When helium is used as the inert gas in the welding area W, more UV light is emitted from the welding area W. A stronger image is formed in the photochromic lens 64. Accordingly, a less responsive photochromic lens 64 may be used, or the effect intentionally elicited from the photochromic lens 64.

Figure 3:
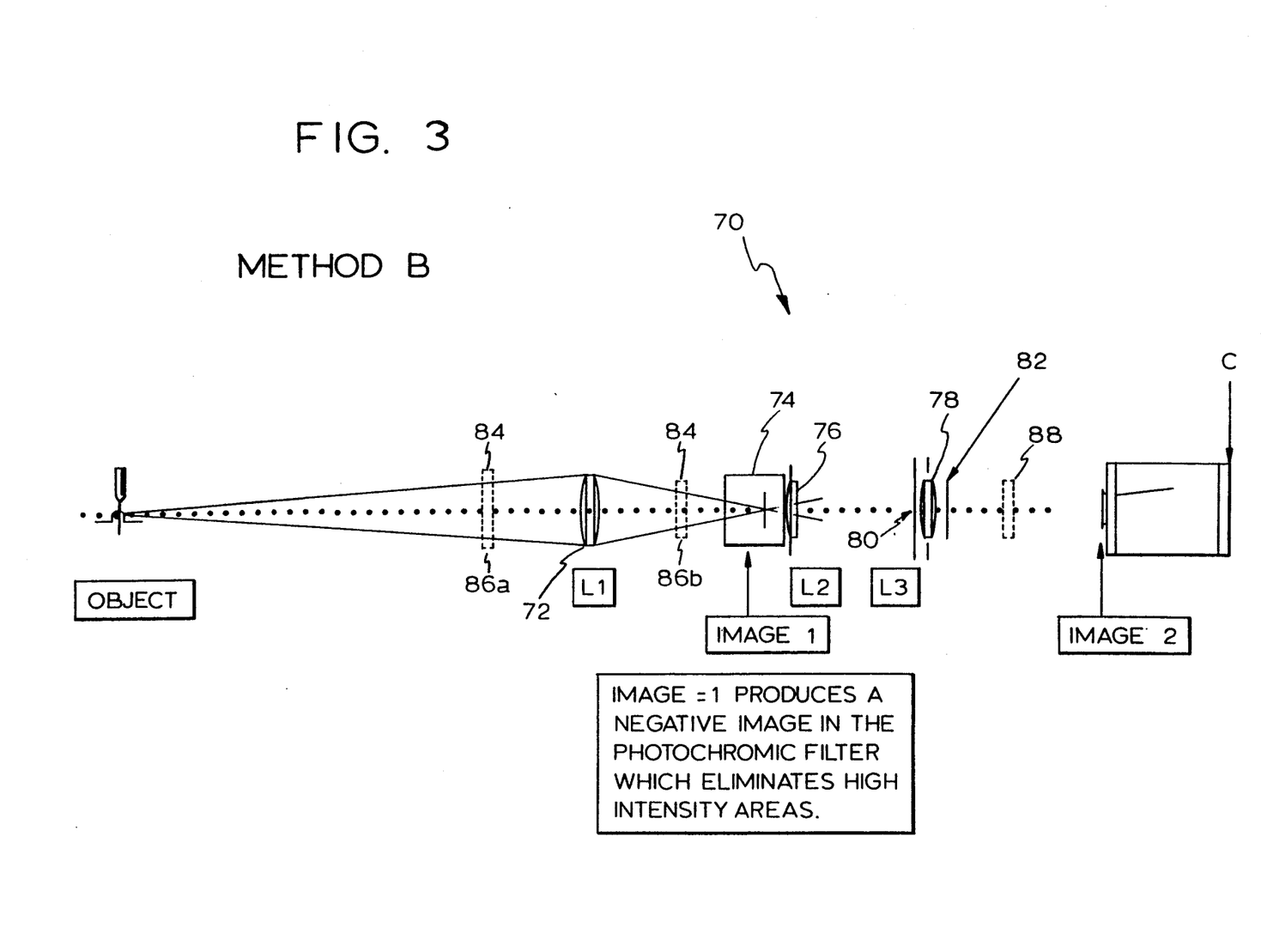
FIG. 3 is a cross-sectional schematic view of the second embodiment of the present invention.

As shown in FIG. 3, the second embodiment 70 of the present invention uses an objective lens assembly 72 that passes both visible and ultraviolet light. Objective lens assembly 72 has a first lens 72a and a second lens 72b. A photochromic lens 74 follows the objective lens assembly 72. A field lens 76, then a relay lens 78, follow the photochromic lens 74.

Light from the welding torch and the weld pool area radiates outwardly from the welding area W. The objective lens assembly 72 gathers a portion of the radiated light, both visible and UV. The gathered light is ultimately transmitted to the camera C, but is mediated to reduce the glare before reaching it.

The light from the objective lens assembly 72 is focussed upon a photochromic lens 74. The UV portion of the light from objective lens assembly 72 forms a negative in the photochromic lens 74 of the image contained in the light transmitted and focussed by the objective lens assembly 72. The negative image formed within the photochromic lens 74 is used as a variable density filter for the positive image transmitted in visible light by the objective lens assembly 72, as for the first embodiment.

As for the first embodiment shown in FIG. 2, the negative image in the photochromic lens 74 varies with the image gathered by the objective lens assembly 72 because the photochromic lens 74 responds to the changing intensity of incident light. Two different types of variation are present within the photochromic lens 74.

The first variation is one of the darkness or transparency present in the photochromic lens 74 itself. As an extreme example, one half of the photochromic lens 74 may be as dark as possible while the other half is as transparent as possible. This is a spatial variation of transparency and darkness across the photochromic lens 74.

The second variation is one of changing darkness or transparency across the photochromic lens 74 as time progresses. As another example, the half dark/half transparent example previously described can change as time goes on. While one half of the photochromic lens 74 remains dark while the other half remains transparent, the actual halves of the photochromic lens 74 that are clear and dark may change. The halves may alternate from top to bottom and back, or they may turn across the photochromic lens 74 in a clockwise or counterclockwise manner. This example is one of a temporal variation of transparency and darkness across the photochromic lens 74 while the total space occupied by darkness and transparency remains the same.

The image formed upon the photochromic lens 74 by the objective lens assembly 72 varies spatially and temporally as the scene in the welding area W varies. The negative image of the photochromic lens 74 serves to variably filter the positive image transmitted by the objective lens assembly 72. The two images are combined by the photochromic lens 74 to proportionally reduce the bright glare of the welding torch and the contrasts present in the light of the welding area W. When the resulting image is received by a television camera C, the transmitted image represents much more accurately the ongoing welding process, the condition of the welding torch, and the condition of the welding puddle. The same is similarly positive for the first embodiment.

The combined positive and negative images are transmitted from the photochromic lens 74 to a field lens 76 which focusses the image from the photochromic lens 74 upon a relay lens 78. The relay lens 78 has a small aperture 80 at its center that allows transmission of the image from the field lens 76 to the camera C. The small relay lens aperture 80 is 0.80 millimeters in diameter and improves the depth of field of the system by keeping in focus a greater amount of space in the welding area.

As in the first embodiment, a UV blocking lens may be used to prevent reception of UV light by the camera. Such a UV blocking lens in the second embodiment may be placed just in front of the camera or just following the photochromic lens 74.

A spectral line blocking filter 82 may also be used to block the transmission of light at the spectral lines of certain elements. Such a filter 82 may be a notch filter at 510 nanometers, as is known in the art for argon. Other spectral line blocking filters may be used at other wavelengths, corresponding to other emission lines for helium, or other inert gases or elements. Other filters known in the art can also be used to control the light before presentation to the camera, C.

The second embodiment differs in one way from the first embodiment as the entirety of the light gathered by the first lens in the second embodiment is transmitted to the photochromic lens 74 and is not filtered to eliminate the major portion of the visible light. Filtration of both visible and ultraviolet light is performed by the relay lens 78 once the light has passed through the photochromic filter 74.

In the second embodiment, the objective lens assembly 72 has a diameter of 20 millimeters and a focal length of 25.4 millimeters. The diameter of the field lens 76 is 12 millimeters with a focal length of 25.0 millimeters. The diameter of the relay lens 78 is 12.5 millimeters with a focal length of 14.2 millimeters. These specifications are set forth in the table below. All units are in millimeters.

| Lens | Diameter | Focal Length |
| --- | --- | --- |
| Objective lens | 20 | 25.4 |
| Field lens | 12 | 25.0 |
| Relay lens | 12.5 | 14.2 |

The objective lens assembly 72 is preferably 98 millimeters (mm) from the welding area W. Likewise, the photochromic lens 74 is 37 mm from the objective lens assembly 72. The field lens 76 is 5 mm from the photochromic lens 74 and the relay lens 78 is 29 mm from the field lens 76. The photoactive plate of the CCD camera, or the location of the focussed image, is 37 mm from relay lens 78.

In order to control the ratio of the UV to visible/bleaching light in the second embodiment shown in FIG. 3, optional filters can be inserted into the path of the light.

The ratio of UV to visible/bleaching light is controlled before the light reaches the photochromic lens 74 as this is where the negative image can have the most impact on the incoming visible light. A special filter lens 84 may be placed anywhere between the photochromic lens 74 and the welding area W. Two locations for special filter lens 84 are shown designated by reference numbers 86a and 86b, on either side of the objective lens assembly 72.

Ideally, the special filter lens 84 prevents the passage of most of the bleaching light while transmitting all of the activating light. A filter passing ten percent (10%) of the light below green while passing one hundred percent (100%) of the light above the short wavelength blue would approach this ideal. Unfortunately, currently available technology supplies such lenses only at significant expense.

Once the light from the welding area has passed through the filter, the ratio of UV activating light to visible/bleaching light is greatly enhanced. With such light and as for the first embodiment of FIG. 2, the photochromic lens 74 provides a negative image for visible light that has been significantly attenuated. Even with such attenuation, the glare of the welding torch provides ample visible light to the photochromic lens 74.

Once the light has passed through the photochromic lens 74 with its negative image, the light is predominately blue in color as the red and green portions of it were attenuated by the special filter lens 84. In order to even out or flatten the spectral intensities of the light, a balancing or evening filter 88 can be used to decrease the blue component of the light. Such a balancing filter lens could, for example, pass one hundred percent (100%) of the red and green components of the light while only passing ten percent (10%) of the blue. Such a lens would be like an inverse of the special filter lens 84.

Alternatively, instead of using a balancing filter lens 88, the camera could be adjusted so that its response to blue light was diminished, so that its response to red and green light was enhanced, or both. Such adjustments are possible with CCD cameras.

Figure 4:
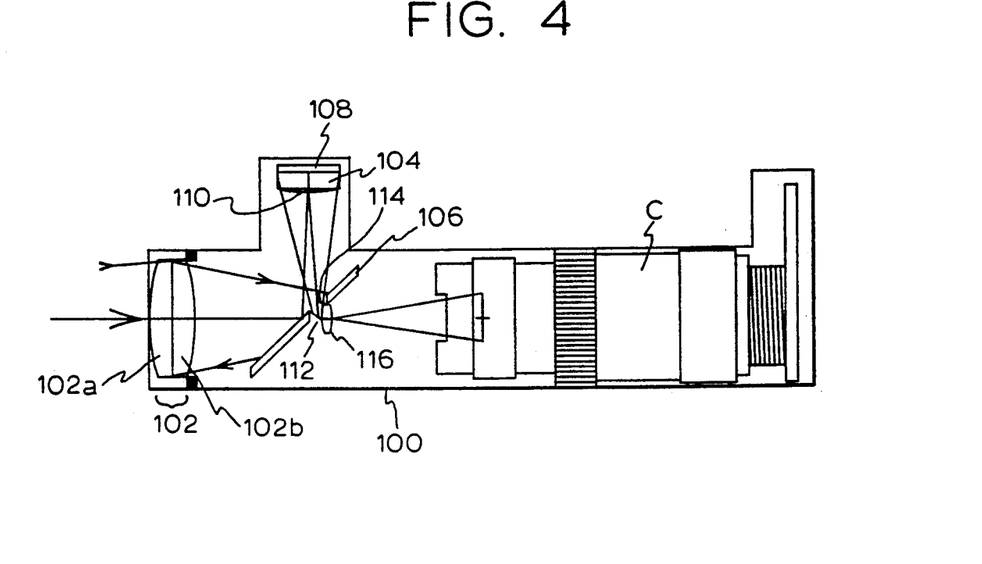
FIG. 4 is a cross-sectional schematic view of a particular construction of the second embodiment shown in FIG. 3.
Figure 5:
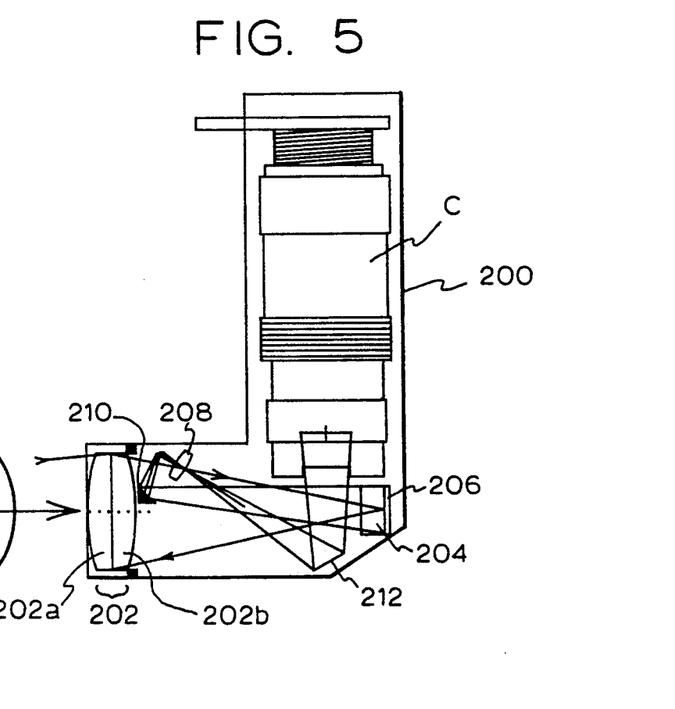
FIG. 5 is a cross-sectional schematic view of another construction of the second embodiment shown in FIG. 3.

FIGS. 4 and 5 show alternative constructions of the embodiment shown in FIG. 3.

In FIG. 4, light enters the camera assembly 100 through the objective lens assembly 102 having first lens 102a and second lens 102b. Objective lens assembly 102 focusses the incoming light upon the photochromic lens 104 via an intermediate mirror 106. The light passes through the photochromic lens 104 twice as a second mirror 108 reflects the light coming into the photochromic lens 104 back towards the intermediate mirror 106. The second passing of the light through the photochromic lens reduces the contrast of the light to the same degree that the first passage did. If only ten percent (10%) of the light passed through the photochromic lens 104 the first time, only ten percent (10%) of that ten percent (10%) would be passed on after the second passage. By the use of only one photochromic lens 104, an effective reduction of ninety-nine percent (99%) of the light passing through it is achieved.

A field lens 110 may be used in conjunction with the photochromic lens 104 in order to focus the light coming back out of the photochromic lens 104 onto a transition mirror 112. The transition mirror 112 is located proximate to an aperture 114 in the intermediate mirror 106. The transition mirror 112 reflect the incoming light through the relay lens 116. The relay lens 116 with its small aperture passes the light onto the CCD camera C for transmission to the welder remotely controlling the welding operation.

Figure 5A:
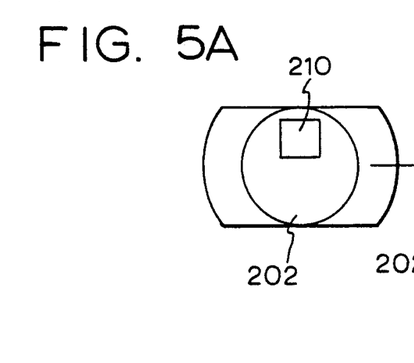
FIG. 5A is a plan view of the front aperture of the camera assembly of FIG. 5.

In FIG. 5, another construction of the embodiment shown in FIG. 3 is shown. The entrance for the light is shown in FIG. 5A. The light enters the camera assembly 200 through the objective lens assembly 202. Objective lens assembly 202 has a first lens 202a and a second lens 202b. Light from the objective lens assembly 202 is focussed upon the photochromic lens 204. Light focussed on photochromic lens 204 is reflected by a mirror 206. The reflected light travels out of the photochromic lens 204 and may be focussed by a field lens (not shown) onto the relay lens 208 via an intermediate mirror 210. The relay lens 208 focusses the light upon the CCD camera C via a second intermediate mirror 212.

The camera C used with the lens system, above, may be a charge coupled device camera, but other types of cameras may also be used. One such commercially available camera is made by ELMO, model number MN401E. While black and white cameras may be used in the present invention, color cameras (including color CCD's) provide better images and may also be used.

The camera C may have its shutter speed adjusted to control the amount of light to its photoactive component and/or to capture an image during a short time period. In the embodiments set forth above, a shutter speed of one-sixtieth (1/60) of a second is used when the welding torch is extinguished and the welding area W is illuminated by lamps. When the welding torch is lit or active, the shutter speed is increased to one-two hundred fiftieth (1/250) of a second.

The camera C may also be movable so that its distance from the welding area W may be changed. In this way, different portions of the welding area W can be observed and magnified.

The photochromic lenses as set forth in the embodiments may be similarly constructed and incorporate the material known as PHOTOEXTRA GRAY as made by Corning Glass in order to perform as photochromic lenses. Other photochromic materials, such as those described in U.S. Pat. No. 3,208,860 issued to Armistead on Sep. 8, 1964, may be used in the present invention. The optical properties of photochromic glass are discussed in an article by G. K. Megla that appeared in Applied Optics, vol. 5, no. 6, beginning on page 945. The teachings of these references as applicable to the present invention are incorporated herein by reference.

While the present invention has been described with regards to particular embodiments, it is recognized that additional variations of the present invention may be devised without departing from the inventive concept.

What is claimed is:

1. A camera assembly for viewing an area of high optical contrast such as a welding operation, the camera assembly comprising:
   a video camera;
   means for forming a negative image, said negative image means darkening in response to light passed to it and focussed upon it; and
   a first lens, said first lens capable of focussing an image of the area upon said negative image means, said negative image means interposed between said video camera and said first lens, whereby said image from said first lens passes through its own negative image in said negative image means resulting in a succeeding image having reduced optical contrast so that an accurate image of said area is transmitted by said video camera.

2. The camera assembly of claim 1, further comprising:
   a second lens, said second lens interposed between said area and said video camera, said second lens defining an aperture.

3. A system of lenses for viewing an intense light source and immediate surroundings of the intense light source, comprising:
   a photochromic lens, said photochromic lens optically darkening in response to light of wavelengths in an approximate range of short wavelength visible and long wavelength ultraviolet light; and
   a first lens, said first lens capable of focussing light of wavelengths in an approximate range of short wavelength visible and long wavelength ultraviolet light, said first lens defining an aperture at its center, said first lens focussing light from the intense light source upon said photochromic lens, whereby said photochromic lens darkens in response to said light focussed upon it by said first lens to form a negative image of said intense light source and its immediate surroundings so that contrast of light passing through said aperture of said first lens and onto said photochromic lens is reduced according to brightness of such aperture light.

4. The system of lenses for viewing an intense light source and immediate surroundings of the intense light of claim 3, further comprising:
an ultraviolet light filter, said ultraviolet light filter inhibiting the further transmission of ultraviolet light from said photochromic lens.

5. The system of lenses for viewing an intense light source and immediate surroundings of the intense light source of claim 4, further comprising:
said ultraviolet filter reflecting ultraviolet light passed to it by said photochromic lens back onto s said photochromic lens to enhance said negative image of said photochromic lens.

6. A system of lenses for viewing an intense light source and its immediate surroundings, comprising:
an objective lens passing both ultraviolet and visible light;
a photochromic lens, said objective lens focussing light upon said photochromic lens, said photochromic lens darkening optically in response to light passed by said objective lens and producing a negative of an image focussed upon said photochromic lens and producing a variable density light filter intersecting visible light focussed upon said photochromic lens by said objective lens;
a field lens, said field lens refracting light incident upon it from said photochromic lens; and
a relay lens, said relay lens defining a small aperture through which light incident upon said relay lens from said field lens is transmitted to an observer or observing device.

7. The lens system of claim 6, further comprising:
a special filter lens, said special filter lens placed between the intense light source and said photochromic lens, said special filter lens enhancing a ratio between light activating said photochromic lens and light bleaching said photochromic lens by allowing light in the approximate spectrum above short wavelength blue to pass through while inhibiting light in the approximate spectrum below green from passing through.

8. The lens system of claim 7, further comprising:
a balancing lens, said balancing lens placed between said photochromic lens and said observer or observing device, said balancing lens allowing light in the approximate spectrum below green to pass through while inhibiting light in the approximate spectrum above short wavelength blue from passing through.

9. The lens system of claim 7, further comprising:
an observing device, said observing device receiving light transmitted by said relay lens, said observing device spectrally compensating for an unbalanced spectrum present in the light transmitted by said relay lens.

10. A method for reducing the optical contrast of a welding area image, the steps comprising:
providing a camera;
providing a negative image of the welding area;
focussing a positive image of the welding area upon said negative image of the welding area and forming a resulting image; and
transmitting said resulting image to said camera.

* * * * *